May 5, 1936.  C. H. HOWLAND-SHEARMAN  2,039,844
POWER TRANSMITTING MACHINERY
Filed July 27, 1934   2 Sheets-Sheet 1

INVENTOR
Charles H. Howland-Shearman
BY
ATTORNEY

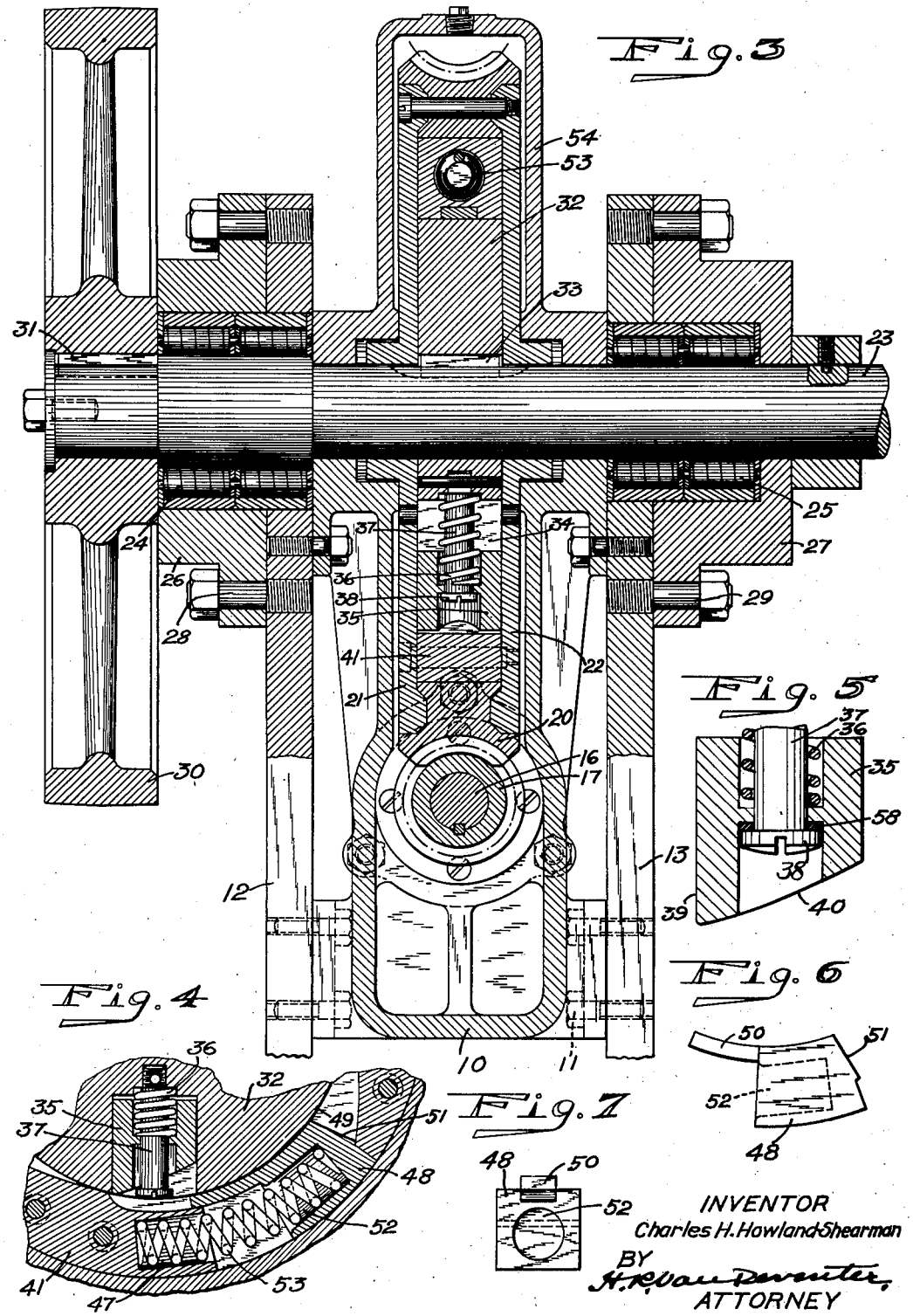

Patented May 5, 1936

2,039,844

UNITED STATES PATENT OFFICE 2,039,844

POWER TRANSMITTING MACHINERY

Charles H. Howland-Shearman, Hamden, Conn.

Application July 27, 1934, Serial No. 737,154

8 Claims. (Cl. 192—46)

This invention relates to improvements in power-transmitting machinery, and has for its principal object the provision of a combined speed-reducer and flexible driving mechanism.

A further object is the inclusion in the flexible driving mechanism of means to store energy upon increase of load resistance and to return the stored energy to the power system when the load resistance decreases.

A further purpose is to provide a balance between the energy-storing means and the inertia characteristics of the driven parts by which release of the stored energy is caused to accelerate the driven parts to their normal speed.

Another purpose is the provision of a cushion or flexible drive in which oscillation or "hunting" is avoided.

A further object is to provide means by which the driven parts may "free-wheel" or over-run the driving parts.

A still further object is the provision of means by which free-wheeling takes place substantially without noise.

Other objects and purposes will appear in the following description of the device in connection with the accompanying drawings, in which:

Figure 3 is a central cross section of the unit shown in Figure 1 viewed from the left;

Figure 4 is a detail section of the driving and driven elements in over-running position;

Figure 5 is an enlarged sectional view of a driven plunger, spring and guide pin;

Figure 6 is a side elevation of a secondary driving member; and

Figure 7 is a left elevation of the same.

The invention consists substantially in the construction, combination, location and relative arrangement of parts, all as will be more fully hereinafter set forth as shown by the accompanying drawings and finally pointed out in the appended claims.

By way of illustration, one embodiment of the invention will be described suitable for use with the machine disclosed in the co-pending application Ser. No. 702,286 wherein the transmission constituting the present invention would be connected through a suitable clutch to the driving shaft 47 shown in the aforesaid application, or to the driving shaft of any other mechanism it is desired to drive when such a transmission is applicable.

Figure 1:
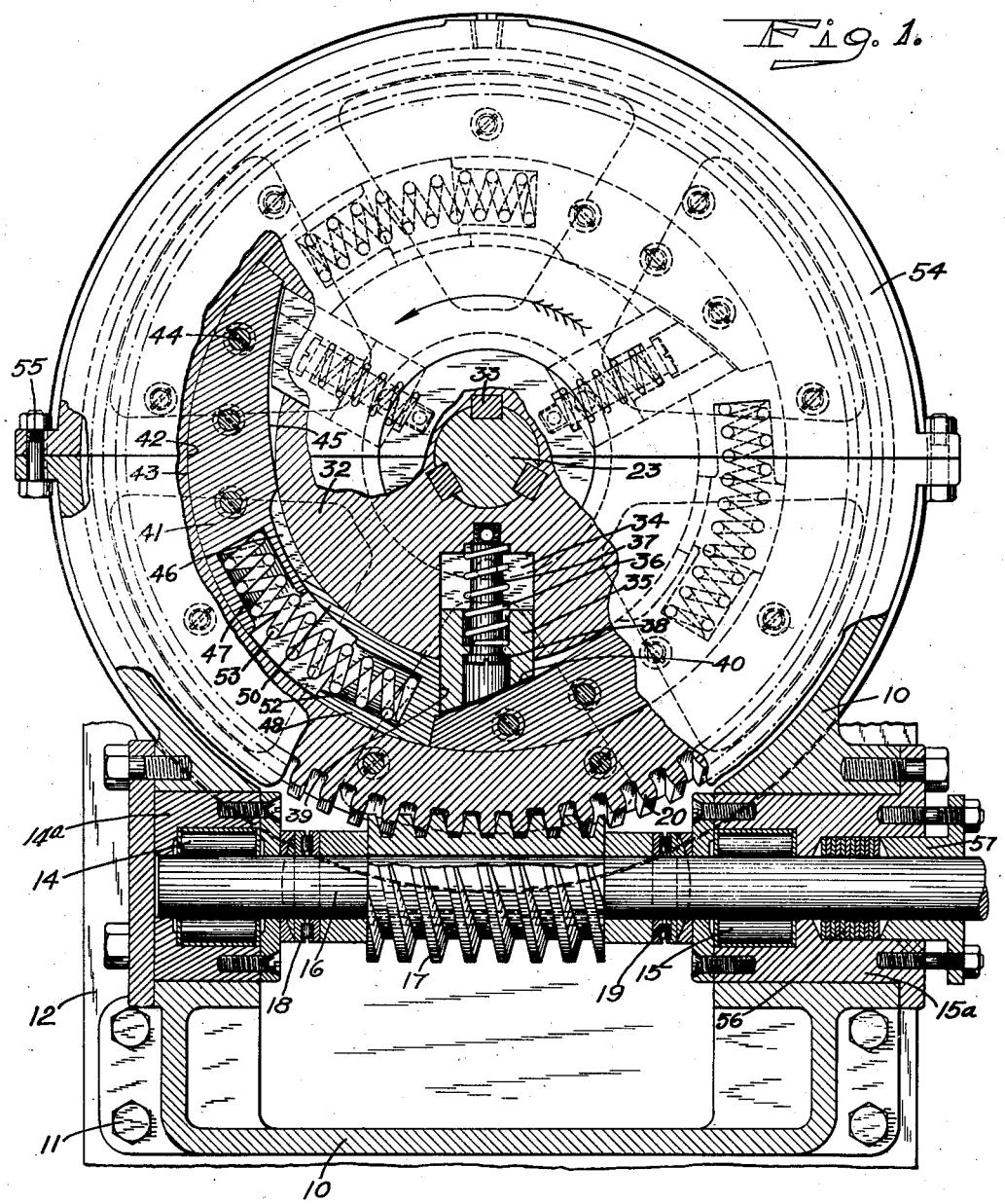
Figure 1 is a side view, partly in section, of the preferred form of flexible drive mechanism.

Referring to Figures 1 and 3 the numeral 10 denotes a casing secured by means of bolts 11 to stationary side plates 12 and 13 which may form the supporting structure of a machine to which the driving device is applied. Journalled in suitable bearings 14 and 15 in cylindrical plugs 14a and 15a, in the casing 10 is a worm shaft 16 carrying a worm 17. Thrust bearings 18 and 19 are provided to absorb the thrust of worm 17 in either direction.

A worm gear ring 20 is bolted to driving plates 21 and 22 rotatably mounted on the power delivery shaft 23 of the machine. The worm gear ring 20 meshes with the worm 17.

The delivery shaft 23 is journaled in suitable bearings 24 and 25, preferably of the roller type, in housings 26 and 27 secured to the side plates 12 and 13 respectively by bolts 28 and 29, Figure 3. Shaft 23 may also carry a flywheel 30 rotatably secured thereto by a key 31.

A driven disk 32 is disposed between the driving plates 21 and 22 and secured to the shaft 23 by keys 33. Radial slots 34 are circumferentially spaced in the disk 32. Each slot 34 contains a radially slidable plunger 35 urged outward by a compression spring 36 guided on a pin 37 fixed in the disk 32. A head 38 on pin 37 limits the outward movement of the plunger 35.

The plungers 35 are formed with contact faces 39 (Figure 5) and inclined curved outer surfaces 40.

Figure 2:
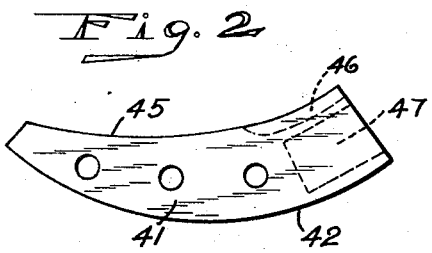
Figure 2 is a side elevation of one of the primary driving members.

Primary driving members or segments 41, having outer curved surfaces 42 (Figure 2) fitting the inside surface 43 of gear ring 20, are angularly spaced therein and are secured to driving plates 21 and 22 by bolts 44. Members 41 have inclined inner surface 45 and contain clearance grooves 46 and end recesses 47.

Curved secondary driving members 48, slidable on the outer circumference 49 of disk 32 and in the inner circumference 43 of gear ring 20, are disposed between the primary driving members 41. Tongues or extensions 50 of members 48 (Figures 6 and 7) are adapted to fit freely in the clearance grooves 46 of members 41. The secondary driving members 48 have driving surfaces 51 and contain end recesses 52.

Curved helical springs 53 disposed between the primary drivers 41 and secondary drivers 48 and guided in the recesses 47 and 52 urge the secondary drivers 48 counterclockwise so as to normally bring their driving surfaces 51 against the contact faces 39 of plungers 35.

The numeral 54 denotes a cover plate or upper protective closure fastened to the top of casing 10 by bolts 55.

The worm shaft 16 is provided with a packing 56 compressed by an adjustable gland 57 for the purpose of retaining lubricant in the casing 10.

If desired, a cushion or silencing washer 58 may be placed under the head 38 of pin 37, as shown in Figure 5.

The operation of the device is as follows: The worm shaft 16 being revolved by any suitable means such as an electric motor, the worm 17 revolves the gear ring 20 counterclockwise at reduced speed and with it the driving plates 21 and 22 and the primary driving members 41. The primary members 41 apply pressure to the springs 53 which pressure is transmitted to the secondary drivers 48, thereby driving the latter. Members 48 being in contact with the plungers 35, drive the latter and through them the driven disk 32. From 32 the drive is transmitted by keys 33 to the power delivery shaft 23, thence to the driven parts of the machine and to the flywheel 30.

It has been noted that the driving force is transmitted from primary drivers 41 to secondary drivers 48 through the springs 53. When the machine is running light the initial compression of springs 53 is sufficient to maintain the driving force, and the parts revolve in the relative position shown in Figure 1. When a heavy load is placed on the delivery shaft 23, tending to slow down the fly wheel 30, shaft 23 and driven disk 32, the additional pressure on the springs 53 causes them to contract until their resistance equals the driving pressure, the primary drivers 41 approaching the secondary drivers 48. The driven disk 32 is then permitted to lag behind the driving gear ring 20 during the increase of load, the energy necessary to overcome the lag being stored in the springs.

As the load resistance is decreased the springs 53 expand, returning their stored energy to the driven disk 32, shaft 23 and flywheel 30, which are thereby accelerated to their original or synchronous speed. Preferably the strength of springs 53 in their normal position is made such as to transmit a moment about the driven shaft center equal to the moment of inertia of the flywheel and related driven parts. By this means a balanced condition is secured in which the energy of contraction of the springs is proportional to the working load and the additional moment caused by the resiliently stored energy is just sufficient to return the driven parts to normal speed upon release of the load. The result is a smooth drive at all times, without tendency to "hunt" and without shock or undue strain on the prime mover and driving parts.

Upon shutting down the prime mover, or in case of slowing down of the latter due to voltage drop, failure of current or other causes, it is desirable that the driven parts be permitted to "free-wheel" or over-run the driving parts. This is particularly necessary in the case of machines using a heavy fly-wheel, as otherwise upon a torque reversal during slowing of the prime mover the tremendous rotative energy of the flywheel would be brought to bear on the teeth of the gear 20 and threads of the worm 17, resulting in their destruction and the wrecking of related parts. With the structure shown "free-wheeling" occurs in the following manner:

As the driven disk 32 runs ahead of the driving gear 20 and attached drivers 41, the inclined surfaces 40 of plungers 35 come in contact with the inclined inner surfaces 45 of drivers 41. The plungers 35 are wedged inward, contracting the springs 36 as they ride up the inclines 45, then slide along the inner surfaces of members 45, the tongues 50 and secondary driving members 48.

As plungers 35 over-run the members 48 the springs 36 expand, forcing the plungers outward to initial position after which they over-run the next pair of drivers in the manner described, and thus continue so long as the speed of the driven parts exceeds that of the drivers.

It should be noted that the plungers 35 do not make contact with the drivers 41 in springing outward, as their outward movement is stopped by the heads 38 of pins 37. Contact between plungers 35 and drivers 41 is made after the plungers have reached their outer position, and is made on low angular sliding surfaces with small initial clearance and with ample lubrication. Due to this fact shock and noise are avoided, and when cushion washers 58 are used under the heads 38 of stop-pins 37 as shown in Figure 5 the "free-wheeling" action is practically silent.

From the foregoing it is seen that the device combines the qualities of a speed reducing device, a cushion drive adapted to automatically return the driven parts to the normal or synchronous speed of the driven machine, and a free-wheeling or over-run mechanism.

While the mechanism, as illustrated, represents the preferred form, it will be understood that the invention is not limited to the exact structure shown, and that various changes may be made without departing from the scope of the invention as defined in the appended claims.

What is claimed is:

1. In a power transmitting device, in combination, a casing, a shaft journalled in said casing, a driving wheel rotatably mounted on said shaft, a plurality of segmental drivers angularly spaced inside said wheel and attached thereto, said drivers having inclined inner surfaces, a plurality of secondary drivers disposed between said first drivers and slidable inside said wheel, springs disposed between said first and second drivers and urging said second drivers in a driving direction, a driven disk fastened to said shaft, a plurality of radial slots in said disk, plungers slidable in said slots and adapted to operatively engage said second drivers, whereby a drive may be transmitted to said disk, resilient means to urge said plungers outward and means attached to said disk to limit the outward motion of said plungers.

2. In a power transmitting device, in combination, a casing, a shaft journalled in said casing, a driving wheel rotatably mounted on said shaft, a plurality of segmental drivers angularly spaced inside said wheel and attached thereto, said drivers having inclined inner surfaces, a plurality of secondary drivers disposed between said first drivers and slidable inside said wheel, springs disposed between said first and second drivers and urging said second drivers in a driving direction, a driven disk fastened to said shaft, a plurality of radial slots in said disk, plungers slidable in said slots and adapted to operatively engage said second drivers, whereby a drive may be transmitted to said disk, resilient means to urge said plungers outward and means attached to said disk to limit the outward motion of said plungers, said plungers having inclined backs adapted to engage said inclined inner surfaces whereby said plungers may over-run said first and second drivers.

3. In a power transmitting device, in combination, a casing, a shaft journalled in said casing, a driving wheel rotatably mounted on said shaft, a plurality of segmental drivers angularly spaced inside said wheel and attached thereto, said drivers having inclined inner surfaces, a plurality of secondary drivers disposed between said first drivers and slidable inside said wheel, springs disposed between said first and second drivers and urging said second drivers in a driving direction, a driven disk fastened to said shaft, a plurality of radial slots in said disk, plungers slidable in said slots and adapted to operatively engage said second drivers, whereby a drive may be transmitted to said disk, resilient means to urge said plungers outward and means attached to said disk to limit the outward motion of said plungers.

4. In a power transmitting device, in combination, a casing, a shaft journalled in said casing, a driving wheel rotatably mounted on said shaft, a plurality of segmental drivers angularly spaced inside said wheel and attached thereto, said drivers having inclined inner surfaces, a plurality of secondary drivers disposed between said first drivers and slidable inside said wheel, springs disposed between said first and second drivers and urging said second drivers in a driving direction, a driven disk fastened to said shaft, a plurality of radial slots in said disk, plungers slidable in said slots and adapted to operatively engage said second drivers, whereby a drive may be transmitted to said disk, resilient means to urge said plungers outward and means attached to said disk to limit the outward motion of said plungers, said plungers having inclined backs adapted to engage said inclined inner surfaces whereby said plungers may over-run said first and second drivers.

5. In a power transmitting device, in combination, a casing, a shaft journalled in said casing, a driving wheel rotatably mounted on said shaft, a plurality of segmental drivers angularly spaced inside said wheel and attached thereto, a plurality of secondary drivers disposed between said first drivers and slidable inside said wheel, springs disposed between said first and second drivers and urging said second drivers in a driving direction, a driven disk fastened to said shaft, a plurality of radial slots in said disk, plungers slidable in said slots and adapted to operatively engage said second drivers, whereby a drive may be transmitted to said disk, resilient means to urge said plungers outward and means attached to said disk to limit the outward motion of said plungers.

6. In a power transmitting device, in combination, a casing, a shaft journalled in said casing, a driving wheel rotatably mounted on said shaft, a plurality of segmental drivers angularly spaced inside said wheel and attached thereto, said drivers having inclined inner surfaces, a plurality of secondary drivers disposed between said first drivers and slidable inside said wheel, springs disposed between said first and second drivers and urging said second drivers in a driving direction, a driven disk fastened to said shaft, a plurality of radial slots in said disk, plungers slidable in said slots and adapted to operatively engage said second drivers, whereby a drive may be transmitted to said disk, resilient means to urge said plungers outward and means attached to said disk to limit the outward motion of said plungers, said plungers having backs adapted to engage said inclined inner surfaces whereby said plungers may over-run said first and second drivers.

7. In a power transmitting device, in combination, a casing, a shaft journalled in said casing, a driving wheel rotatably mounted on said shaft, a plurality of segmental drivers angularly spaced inside said wheel and attached thereto, a plurality of secondary drivers disposed between said first drivers and slidable inside said wheel, springs disposed between said first and second drivers and urging said second drivers in a driving direction, a driven disk fastened to said shaft, a plurality of radial slots in said disk, plungers slidable in said slots and adapted to operatively engage said second drivers, whereby a drive may be transmitted to said disk, resilient means to urge said plungers outward and means attached to said disk to limit the outward motion of said plungers, said plungers having inclined backs adapted to engage said first drivers whereby said plungers may over-run said first and second drivers.

8. In a power transmitting device, in combination, a casing, a shaft journalled in said casing, a driving wheel rotatably mounted on said shaft, a plurality of segmental drivers angularly spaced inside said wheel and attached thereto, said drivers having inclined inner surfaces, a plurality of secondary drivers disposed between said first drivers and slidable inside said wheel, means adapted to store energy disposed between said first and second drivers and urging said second drivers in a driving direction, a driven disk fastened to said shaft, a plurality of radial slots in said disk, plungers slidable in said slots and adapted to operatively engage said second drivers, whereby a drive may be transmitted to said disk, resilient means to urge said plungers outward and means attached to said disk to limit the outward motion of said plungers.

CHARLES H. HOWLAND-SHEARMAN.